United States Patent
Dong et al.

(10) Patent No.: US 10,836,846 B2
(45) Date of Patent: Nov. 17, 2020

(54) OLEFIN POLYMERIZATION CATALYST, PREPARATION METHOD THEREOF, OLEFIN POLYMERIZATION CATALYST SYSTEM, USE THEREOF, AND METHOD OF PREPARING POLYOLEFIN RESIN

(71) Applicants: Institute of Chemistry, Chinese Academy of Sciences, Beijing (CN); University of Chinese Academy of Sciences, Beijing (CN)

(72) Inventors: Jinyong Dong, Beijing (CN); Yawei Qin, Beijing (CN)

(73) Assignees: Institute of Chemistry, Chinese Academy of Sciences, Beijing (CN); University of Chinese Academy of Sciences, Beijing (CN)

( * ) Notice: Subject to any disclaimer, the term of this patent is extended or adjusted under 35 U.S.C. 154(b) by 114 days.

(21) Appl. No.: 15/767,826

(22) PCT Filed: Oct. 12, 2015

(86) PCT No.: PCT/CN2015/091735
§ 371 (c)(1),
(2) Date: Apr. 12, 2018

(87) PCT Pub. No.: WO2017/063118
PCT Pub. Date: Apr. 20, 2017

(65) Prior Publication Data
US 2018/0305477 A1 Oct. 25, 2018

(51) Int. Cl.
| | | |
|---|---|---|
| C08F 4/649 | (2006.01) | |
| C08F 4/646 | (2006.01) | |
| C08F 4/02 | (2006.01) | |
| C08F 110/06 | (2006.01) | |
| C08F 4/6592 | (2006.01) | |
| C08F 10/06 | (2006.01) | |
| C08F 4/42 | (2006.01) | |
| C08F 10/00 | (2006.01) | |

(52) U.S. Cl.
CPC ............ *C08F 10/06* (2013.01); *C08F 4/42* (2013.01); *C08F 4/649* (2013.01); *C08F 10/00* (2013.01); *C08F 110/06* (2013.01); *C08F 4/6592* (2013.01)

(58) Field of Classification Search
CPC ...... C08F 4/6455; C08F 4/6457; C08F 4/649; C08F 4/658; C08F 10/00; C08F 4/6592; C08F 110/06
See application file for complete search history.

(56) References Cited

U.S. PATENT DOCUMENTS

| | | | | |
|---|---|---|---|---|
| 4,229,558 | A * | 10/1980 | Kakogawa | ........... C08F 10/00 526/125.6 |
| 5,081,190 | A | 1/1992 | Asanuma et al. | |
| 5,550,194 | A | 8/1996 | Hoxmeier et al. | |
| 2003/0212225 | A1 | 11/2003 | Wang et al. | |
| 2008/0234448 | A1 | 9/2008 | Pratt | |

FOREIGN PATENT DOCUMENTS

| | | |
|---|---|---|
| CN | 1057467 A | 1/1992 |
| CN | 1965004 A | 5/2007 |
| CN | 103665203 A | 3/2014 |
| CN | 103665204 A | 3/2014 |
| CN | 104448063 A | 3/2015 |
| JP | 61207406 A | 9/1986 |
| JP | 63238109 A | 10/1988 |
| WO | 9901485 A1 | 1/1999 |
| WO | 2011028523 A2 | 3/2011 |

OTHER PUBLICATIONS

Gibson, V.C. and Spitzmesser, S.K. "Advances in Non-Metallocene Olefin Polymerization Catalysis" (2003) Chem. Rev. 103: 283-315.
Kaminsky, W. "The Discovery of Metallocene Catalysts and Their Present State of the Art" (2004) J. of Polymer Sci. Part A: Polymer Chemistry 42: 3911-3921.

* cited by examiner

*Primary Examiner* — Caixia Lu
(74) *Attorney, Agent, or Firm* — Volpe Koenig

(57) ABSTRACT

The present invention provides modified olefin polymerization catalyst, preparation method thereof, olefin polymerization catalyst system, use thereof and method of preparing polyolefin resin. The catalyst comprises an olefin polymerization catalyst and an organosilane, which is represented by a general formula $R^1_m SiX_n(OR^2)_k$, where $R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer from 1-3, n is an integer from 1-3, k is an integer within a range of 0-2, and m+n+k=4. High-performance polyolefin resins, including homopolymerized polyolefin resin with high melt and mechanical strength, polyolefin elastomer with high rubber phase content, and polyolefin elastomer with a rubber phase in a crosslinked structure, etc., can be obtained through polymerization with the catalyst.

6 Claims, No Drawings

OLEFIN POLYMERIZATION CATALYST, PREPARATION METHOD THEREOF, OLEFIN POLYMERIZATION CATALYST SYSTEM, USE THEREOF, AND METHOD OF PREPARING POLYOLEFIN RESIN

CROSS REFERENCE TO RELATED APPLICATION

This application is a 35 USC § 371 National Stage application of International Patent Application No. PCT/CN2015/091735, which was filed Oct. 12, 2015, was entitled "Olefin Polymerization Catalyst, Preparation Method Therefor, Olefin Polymerization Catalyst System, Application Thereof, and Preparation Method for Polyolefin Resin," and is incorporated herein by reference as if fully set forth.

FIELD OF THE INVENTION

The present invention relates to the olefin polymerization catalyst field, in particular to a modified olefin polymerization catalyst, a method of preparing the modified olefin polymerization catalyst, a modified olefin polymerization catalyst system, a use of the modified olefin polymerization catalyst system in olefin polymerization, and a method of preparing polyolefin resin.

BACKGROUND OF THE INVENTION

In recent years, though olefin polymerization modifiers that have new structures and new features have been discovered and applied in researches for improving the performance of polyolefin resins continuously, effective catalytic polymerization means for preparing some high-performance polyolefin resins that have wide application prospects are still inadequate. For example, crosslinked polypropylene with high melt strength has wide application prospects in application domains such as blow molding and foaming, but there is still no effective polymerization method to prepare such polypropylene directly in polymerization reactors. For another example, in-reactor polypropylene alloy represented by high impact copolymer polypropylene (hiPP) have great application potentials in fields such as automobile, instrument and equipment, and durable consumer goods, but the in-reactor polypropylene alloy resins have drawbacks such as low interfacial adhesion between polypropylene phase and ethylene-propylene rubber phase, and unstable phase separation scale, etc., which result in low melt strength and poor mechanical properties of the in-reactor polypropylene alloy resins and have strong impact on the operational performance of the in-reactor polypropylene alloy resins.

To improve the melt strength and mechanical strength of polypropylene resins, at present, measures such as radiation modification and graft modification, etc. are mainly taken to obtain polypropylene resins having a long-chain branched structure or crosslinked structure, or measures such as introduction of high molecular polypropylene components, inorganic fillers, and copolymerization components, etc. are taken to improve the melt strength and mechanical strength of polypropylene resins. Though those measures can improve the melt strength and mechanical properties of polyolefin resins to some extent, they involve drawbacks such as high production cost and mono-specific product properties, etc.

Catalyst innovation and polymerization process innovation are two main approaches to obtain polyolefin resins with high rubber content. Though polyolefin elastomers (TPO) with rubber phase content higher than 50% can be obtained by new polymerization processes in foreign countries now, those processes have to be used in association with specific catalysts. Besides, polypropylene-based thermoplastic elastomers in which the rubber phase is in a crosslinked structure (Thermoplastic Dynamic Vulcanizate, TPV) have outstanding mechanical properties and high added values, and have wide application prospects in high-end application domains. However, existing TPV products are mainly obtained through modification processes after polymerization (dynamic vulcanization and crosslinking). There is no report on preparation of TPV by an in-reactor polymerization process.

CONTENT OF THE INVENTION

The objects of the present invention are to provide an innovative modified olefin polymerization catalyst, a method of preparing the modified olefin polymerization catalyst, a modified olefin polymerization catalyst system, a use of the modified olefin polymerization catalyst system in olefin polymerization reaction, and a method of preparing polyolefin resin. Specifically, the present invention provides a modified olefin polymerization catalyst wherein containing an olefin polymerization catalyst and an organosilane, wherein the organosilane is represented by a general formula $R^1{}_m SiX_n(OR^2)_k$, wherein $R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

The present invention further provides a method of preparing a modified olefin polymerization catalyst comprising: mixing an olefin polymerization catalyst with an organosilane homogeneously, wherein the organosilane is represented by a general formula $R^1{}_m SiX_n(OR^2)_k$, where, $R^1$ is a $C_2$-$C_{20}$ alkyl group and a terminal of $R^1$ contains an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

The present invention further provides a modified olefin polymerization catalyst system containing the above-mentioned modified olefin polymerization catalyst or a modified olefin polymerization catalyst obtained by the above-mentioned method, alkyl aluminum, and an optional external electron donor.

The present invention further provides a use of the modified olefin polymerization catalyst system in olefin polymerization reaction.

Moreover, the present invention further provides a method of preparing polyolefin resin comprising: conducting an olefin polymerization reaction of an olefin monomer in the presence of a catalyst, wherein the catalyst is the above-mentioned modified olefin polymerization catalyst system.

Through in-depth research, the inventor of the present invention has found that the organosilane represented by the general formula $R^1{}_m SiX_n(OR^2)_k$ behaves quite differently from the organosilane represented by a general formula $Si(OR')_4$ (wherein R' is a $C_1$-$C_{20}$ alkyl group) and the organohalosilane represented by a general formula $SiX'_4$ (wherein X' is a halogen element) during the olefin polymerization reaction process. When the organosilane represented by the general formula $R^1{}_mSiX_n(OR^2)_k$ is used in association with a conventional olefin polymerization catalyst, a series of high-performance polyolefin resins, including homopolymerized polyolefin resin with high melt strength and high mechanical strength, polyolefin elastomer with high rubber phase content, and polyolefin elastomer with a rubber phase in a crosslinked structure, etc., can be obtained through in-reactor polymerization. Furthermore, the method of preparing polyolefin resin provided in the present invention can attain a purpose of adjusting the degree of branching or crosslinking of the obtained polyolefin resins in a controlled manner by adjusting the kind and dose of the organosilane, so that a series of high-melt strength polyolefin resins with adjustable melt strength and controllable mechanical properties can be obtained, and even crosslinked polyolefin resins can be obtained, and thereby polyolefin resins with high and diversified performance can be prepared at a low cost.

According to a preferred embodiment of the present invention, if the $R^1$ in the organosilane is a $C_2$-$C_{20}$ alkyl group and a terminal of $R^1$ has an α-double bond, a norbornene group, a cycloolefin group or a dicyclopentadiene group, X is a halogen element, $R^2$ is a $C_1$-$C_{10}$ linear chain, branched chain or isomerized alkyl group, m is 1 or 2, n is 2 or 3, k is 0, and m+n+k=4, or if the $R^1$ is a $C_2$-$C_{18}$ alkyl group and a terminal of $R^1$ has an α-olefin double bond, a norbornene group, a cycloolefin group or a dicyclopentadiene group, X is a halogen element, $R^2$ is a $C_1$-$C_5$ linear chain, branched chain or isomerized alkyl group, m is 1, n is 3, and k is 0, the obtained homopolymerized polyolefin resin has higher melt strength and higher mechanical strength.

According to another preferred embodiment of the present invention, if the $R^1$ in the organosilane is a $C_2$-$C_{20}$ alkyl group and a terminal of $R^1$ has an α-double bond, a norbornene group, a cycloolefin group or a dicyclopentadiene group, X is a halogen element, $R^2$ is a $C_1$-$C_{10}$ linear chain, branched chain or isomerized alkyl group, m is 2 or 3, n is 1 or 2, k is 0, and m+n+k=4, the obtained polyolefin elastomer has higher rubber phase content, and the rubber phase is crosslinked to a higher degree.

According to yet another preferred embodiment of the present invention, if the modified olefin polymerization catalyst further contains halloysite, the obtained homopolymerized polyolefin resin has higher melt strength and higher mechanical strength, and the obtained polyolefin elastomer has higher rubber phase content and the degree of crosslinking of the rubber phase is higher.

Other features and advantages of the present invention will be further detailed in the embodiments hereunder.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The modified olefin polymerization catalyst provided in the present invention contains an olefin polymerization catalyst and an organosilane represented by a general formula $R^1{}_mSiX_n(OR^2)_k$, wherein a plurality of $R^1$ is the same general formula may be the same or different from each other, and may be a $C_2$-$C_{20}$ alkyl group respectively and independently, and a terminal of $R^1$ has an α-olefin double bond, a norbornene group, a cycloolefin group or a dicyclopentadiene group; a plurality of X in the same general formula may be the same or different from each other, and may be a halogen element (including fluorine, chlorine, bromine, iodine) respectively and independently; a plurality of $R^2$ in the same general formula may be the same or different from each other, and may be a $C_1$-$C_{20}$ linear chain, branched chain or isomerized alkyl group respectively and independently; m is an integer with a range of 1-3, n is an integer within a range of 1-3, k is an integer within a range of 0-2, and m+n+k=4.

According to a preferred embodiment of the present invention, a plurality of $R^1$ in the same general formula may be the same or different from each other, and is a $C_2$-$C_{20}$ alkyl group respectively and independently, and a terminal of $R^1$ has an α-olefin double bond, a norbornene group, a cycloolefin group or a dicyclopentadiene group; a plurality of X in the same general formula may be the same or different from each other, and is a halogen element (including fluorine, chlorine, bromine, iodine) respectively and independently; a plurality of $R^2$ in the same general formula may be the same or different from each other, and is a $C_1$-$C_{10}$ linear chain, branched chain or isomerized alkyl group respectively and independently; m is 1 or 2, n is 2 or 3, k is 0, and m+n+k=4. More preferably, a plurality of $R^1$ in the same general formula may be the same or different from each other, and is a $C_2$-$C_{18}$ alkyl group respectively and independently, and a terminal of $R^1$ has an α-olefin double bond, a norbornene group, a cycloolefin group or a dicyclopentadiene group; a plurality of X in the same general formula may be the same or different from each other, and is a halogen element (including fluorine, chlorine, bromine, iodine) respectively and independently; a plurality of $R^2$ in the same general formula may be the same or different from each other, and is a $C_1$-$C_5$ linear chain, branched chain or isomerized alkyl group respectively and independently; m is 1, n is 3, and k is 0. When the preferred organosilane described above is used as a modifier in association with a conventional olefin polymerization catalyst, the melt strength and mechanical strength of the homopolymerized polyolefin resin can be further improved. According to another preferred embodiment of the present invention, a plurality of $R^1$ in the same general formula may be the same or different from each other, and may be a $C_2$-$C_{20}$ alkyl group respectively and independently, and a terminal of $R^1$ has an α-olefin double bond, a norbornene group, a cycloolefin group or a dicyclopentadiene group; a plurality of X in the same general formula may be the same or different from each other, and is a halogen element (including fluorine, chlorine, bromine, iodine) respectively and independently; a plurality of $R^2$ in the same general formula may be the same or different from each other, and is a $C_1$-$C_{10}$ linear chain, branched chain or isomerized alkyl group respectively and independently; m is 2 or 3, n is 1 or 2, k is 0, and m+n+k=4. When the preferred organosilane is used as a modifier, the content and crosslinking degree of the rubber phase in the polyolefin elastomer can be further improved.

In the case that a terminal of $R^1$ has an α-olefin double bond ($CH_2=CH-$) there is no particular restriction on the structure of the middle part of $R^1$ except for the α-olefin double bond; specifically, the middle part may include a linear chain alkyl group (including double bonds and triple bonds, etc.) or its isomers. In that case, examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, and triallyl chlorosilane, etc. In the case that a terminal of $R^1$ has a norbornene group, preferably the structure of $R^1$ is represented by the following Formula (1):

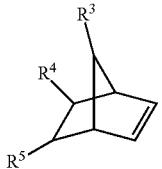

Formula (1)

Wherein, the group bonded to silicon atom may be $R^3$, $R^4$, or $R^5$, and $R^3$, $R^4$ and $R^5$ are H or $C_1$-$C_{10}$ alkyl (including alkenyl, alkynyl, or cycloalkenyl, etc.) respectively and independently, but are not limited to specific structures, including linear chain alkyl or its isomers. For example, if $R^1$ has the structure represented by Formula (1), $R^3$ is a hydrogen atom, $R^4$ is ethylidene and is bonded to the silicon atom, $R^5$ is ethyl, m=1, n=3, k=0, and X is Cl, the organosilane is 2-(5-ethylidene-2-norbornene) ethyl trichlorosilane; if $R^1$ has the structure represented by Formula (1), $R^3$ is H, $R^4$ is =CH—CH$_3$, $R^5$ is ethylidene and is bonded to the silicon atom, m=2, n=2, k=0, and X is Cl, the organosilane is 2-(5-ethylidene-2-norbornene) ethyl allyl dichlorosilane; if $R^1$ has the structure represented by Formula (1), $R^3$ is H, $R^4$ is ethylidene and is bonded to the silicon atom, $R^5$ is ethyl, m=2, n=2, k=0, and X is Cl, the organosilane is di-[2-(5-ethylidene-2-norbornene) ethyl] dichlorosilane.

If a terminal of $R^1$ has a cycloolefin group, the carbon number of the cycloolefin group may be 3-10, the number of double bonds in the cycloolefin group may be 1-3, the carbon number of the alkyl chain that connects the cycloolefin group with the silicon atom may be 1-10, and the alkyl includes linear chain alkyl or its isomers. Furthermore, the ring of the cycloolefin group may have a branch chain, which preferably is $C_1$-$C_5$ alkyl. In that case, examples of the organosilane include, but are not limited to at least one of 2-(3-cyclohexenyl) ethyl trichlorosilane, 4-(2,7-cyclooctadiene) butyl trichlorosilane, di-[2-(3-cyclohexenyl) ethyl)] dichlorosilane, 2-(dicyclopentadiene) ethylidene allyl dichlorosilane, and 2-(dicyclopentadiene) ethylidene trichlorosilane.

In the case that the terminal of $R^1$ contains dicyclopentadiene group, preferably the structure of $R^1$ is represented by the following Formula (2):

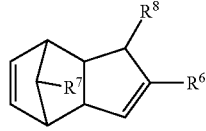

Formula (2)

Wherein, the group bonded to silicon atom may be $R^6$, $R^7$, or $R^8$, and $R^6$, $R^7$ and $R^8$ are H or $C_1$-$C_{10}$ alkyl respectively and independently, but are not limited to specific structures, including linear chain alkyl or its isomers. For example, if $R^1$ has the structure represented by Formula (2), $R^6$ and $R^7$ are H, $R^8$ is ethylidene and is bonded to the silicon atom, m=1, n=3, k=0, and X is Cl, the organosilane is 2-(dicyclopentadiene) ethylidene trichlorosilane; if $R^1$ has the structure represented by Formula (2), $R^6$ is H, $R^7$ is H, $R^8$ is 1,2-ethylidene and is bonded to silicon atom, m=2, n=2, k=0, and X is Cl, the organosilane is 2-(dicyclopentadiene) ethylidene allyl dichlorosilane; if $R^1$ has the structure represented by Formula (2), $R^6$ and $R^7$ are H, $R^8$ is ethylidene and is bonded to silicon atom, m=2, n=2, k=0, and X is Cl, the organosilane is di-[2-(dicyclopentadiene) ethylidene] dichlorosilane.

As described above, the examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, triallyl chlorosilane, 2-(5-ethylidene-2-norbornene) ethyl trichlorosilane, 2-(5-ethylidene-2-norbornene) ethyl allyl dichlorosilane, di-[2-(5-ethylidene-2-norbornene) ethyl] dichlorosilane, 2-(3-cyclohexenyl) ethyl trichlorosilane, 4-(2,7-cyclooctadiene) butyl trichlorosilane, di-[2-(3-cyclohexenyl) ethyl)] dichlorosilane, 2-(dicyclopentadiene) ethylidene allyl dichlorosilane, 2-(dicyclopentadiene) ethylidene trichlorosilane, 2-(dicyclopentadiene) ethylidene allyl dichlorosilane, and di-[2-(dicyclopentadiene) ethylidene] dichlorosilane.

When the modified olefin polymerization catalyst is used to prepare a homopolymerized polyolefin resin, the organosilane particularly preferably is at least one of 7-octenyl trichlorosilane, 5-hexenyl trichlorosilane, allyl trichlorosilane, 2-(5-ethylidene-2-norbornene) ethyl trichlorosilane, 2-(3-cyclohexenyl) ethyl trichlorosilane, 4-(2,7-cyclooctadiene) butyl trichlorosilane, and 2-(dicyclopentadiene) ethylidene trichlorosilane; if the preferred organosilane is used as a modifier in association with a conventional olefin polymerization catalyst, the melt strength and mechanical strength of the homopolymerized polyolefin resin can be further improved.

When the modified olefin polymerization catalyst is used to prepare a polyolefin elastomer (e.g., a polyolefin in-reactor alloy), the organosilane particularly preferably is at least one of 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, di-(7-octenyl) dichlorosilane, triallyl chlorosilane, di-(allyl) dichlorosilane, 2-(5-ethylidene-2-norbornene) ethyl allyl dichlorosilane, di-[2-(5-ethylidene-2-norbornene) ethyl] dichlorosilane, di-[2-(3-cyclohexenyl) ethyl] dichlorosilane, 2-(dicyclopentadiene) ethylidene allyl dichlorosilane, and di-[2-(dicyclopentadiene) ethylidene] dichlorosilane; if the above-mentioned preferred organosilane is used as a modifier in association with a conventional olefin polymerization catalyst, the content and crosslinking degree of the rubber phase in the polyolefin elastomer can be further improved.

There is no particular restriction on the content of the olefin polymerization catalyst and the content of the organosilane in the modified olefin polymerization catalyst in the present invention. However, to enable the two components to attain a better synergistic effect, preferably, in relation to 100 pbw olefin polymerization catalyst, the content of the organosilane is 10-10,000 pbw, more preferably is 20-2,000 pbw, and particularly preferably is 20-200 pbw.

According to the modified olefin polymerization catalyst provided in the present invention, preferably the modified olefin polymerization catalyst further contains halloysite, so that the melt strength and mechanical property of the homopolymerized polyolefin resin can be further improved, and the content of rubber phase and the degree of crosslinking of rubber in the polyolefin elastomer can be further improved. from natural halloysite and/or metahalloysite The natural halloysite and metahalloysite contain hydroxy groups, the organically modified halloysite is obtained by means of chemical bonding between the hydroxy groups in the natural halloysite and/or metahalloysite and the functional groups that can react with hydroxy groups and are in an organic silicon compound, titanium compound, and organic compound that is free of silicon and titanium and has a terminal with a double bond. The specific reaction conditions are well known to those skilled in the art, and will not be further detailed here. It should be noted: if the organic silicon compound, the titanium compound, or the organic compound that is free of silicon and titanium and has a terminal with a double bond doesn't contain any functional groups that can react with hydroxy, the halloysite may be modified first to introduce functional groups that can react with at least one kind of groups in the organic silicon compound, the titanium compound, or the organic compound that is free of silicon and titanium and has a terminal with a double bond. That is a technical means well known to those skilled in the art, and will not be further detailed here. Wherein, the general formula of the organic silicon compound is $Q^1Q^2SiQ^3{}_2$, wherein $Q^1$ is halogen, vinyl, amido, $C_1$-$C_5$ aminoalkyl, epoxy, methylacryloyloxy, sulfhydryl, $C_1$-$C_5$ alkoxy, ureido, or alkyl that contains an α-olefin double bond and is represented by the general formula —$(CH_2)_{m1}COOCH(CH_3)$=$CH_2$, wherein m1 is an integer with an range of 1-18; $Q^2$ is a halogen element, $C_1$-$C_5$ alkoxy or alkyl group represented by the general formula —$(CH_2)_{m2}$—$CH_3$, wherein m2 is an integer with a range of 0-2; $Q^3$ is a halogen element, $C_1$-$C_5$ alkoxy or acetoxy. In consideration of raw material availability, the organic silicon compound particularly preferably is γ-methacryloxypropyltrimethoxysilane and/or γ-aminopropyl-triethoxysilane. The titanium compound is represented by the general formula $Q^4{}_p Ti(OQ^5)_{4-p}$, wherein $Q^4$ and $Q^5$ are $C_1$-$C_4$ alkyl, and p is an integer within a range of 0-3. In consideration of raw material availability, the titanium compound particularly preferably is at least one of butyl titanate, methyl triethoxy titanium, methyl trimethoxy titanium, and tetraethyl titanate. The organic compound that is free of silicon and titanium and has a terminal with a double bond is represented by the general formula $Q^6Q^7CH$=$CH_2$, wherein $Q^6$ is acyl chloride, carboxy, epoxy or ester, and $Q^7$ is $C_1$-$C_{20}$ alkylene or $C_1$-$C_{20}$ alkylidene with ester, oxygen or carboxy. In consideration of raw material availability, the organic compound that is free of silicon and titanium and has a terminal with a double bond is represented by at least one of structural formulae $HOOC(CH_2)_4CH$=$CH_2$, $HOOC(CH_2)_7CH$=$CH_2$ and $HOOC(CH_2)_9CH$=$CH_2$.

Furthermore, in the case that the modified olefin polymerization catalyst further contains halloysite, in relation to 100 pbw olefin polymerization catalyst, the content of the halloysite preferably is 5-80 pbw, more preferably is 5-50 pbw.

A main improvement in the modified olefin polymerization catalyst provided in the present invention lies in that the above-mentioned organosilane is added into the olefin polymerization catalyst and preferably, halloysite is further added into the olefin polymerization catalyst. The kind of the olefin polymerization catalyst may be a conventional choice in the art; for example, the olefin polymerization catalyst may be at least one of Ziegler-Natta catalyst, metallocene catalyst, and non-metallocene catalyst. Those olefin polymerization catalysts may be supported (magnesium halide supported or silicon dioxide supported) catalysts or non-supported catalysts. For example, supported Ziegler-Natta catalysts may include magnesium halide supported Ziegler-Natta catalysts and silicon dioxide supported Ziegler-Natta catalysts, wherein the magnesium halide supported Ziegler-Natta catalysts contain magnesium halide, titanium tetrahalide and/or alkoxy titanate, and an internal electron donor. The magnesium halide may be magnesium chloride and/or magnesium bromide. The titanium tetrahalide may be at least one of $TiCl_4$, $TiBr_4$ and $TiI_4$, particularly preferably is $TiCl_4$. The alkoxy in the alkoxy titanate may be substituted or non-substituted $C_1$-$C_5$ alkoxy, wherein the substituent is usually a halogen atom. Specifically, examples of the alkoxy titanate include, but are not limited to at least one of $Ti(OEt)Cl_3$, $Ti(OEt)_2Cl_2$, $Ti(OEt)_3Cl$, $Ti(OEt)_4$ and $Ti(OBu)_4$. The internal electron donor may be at least one of diether compound, carboxylic ether compound, alcohol ester, ketone, amine, and silicane, particularly preferably be a diether compound and/or carboxylic ether compound. Specifically, examples of the diether compound include, but are not limited to one or more of 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorphenyl)-1,3-dimethoxypropane, 2-(diphenylmethyl)-1,3-dimethoxypropane, 2,2-dicyclohexyl-1,3-dimethoxypropane, 2,2-dicycloamyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis-(2-cyclohexyl ethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis-(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane and 9,9-bis(methoxymethyl) fluorene, particularly preferably is 9,9-bis(methoxymethyl) fluorene.

Examples of the carboxylic ether compound include, but are not limited to one or more of diethyl succinate, dibutyl succinate, diethyl o-phthalate, dibutyl o-phthalate, diisobutyl o-phthalate, di-n-octyl o-phthalate, di-iso-octyl o-phthalate, ethyl benzoate, ethyl p-methoxybenzoate, ethyl p-ethoxybenzoate, triethyl trimellitate, and tributyl trimellitate, particularly preferably is dibutyl o-phthalate and/or diisobutyl o-phthalate.

Furthermore, based on the total weight of the magnesium halide supported Ziegler-Natta catalyst, the content of the magnesium halide in the magnesium halide supported Ziegler-Natta catalyst may be 60-80 wt. %, the total content of the titanium tetrahalide and the alkoxy titanate may be 1-20 wt. %, and the content of the internal electron donor may be 1-20 wt. %.

The method of preparing a modified olefin polymerization catalyst provided in the present invention comprises: mixing an olefin polymerization catalyst with organosilane homogeneously, wherein the organosilane is represented by the general formula $R^1{}_m SiX_n(OR^2)_k$, wherein $R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

There is no particular restriction on the dose of the olefin polymerization catalyst and the dose of the organosilane in the present invention. However, to enable the two components to attain a better synergistic effect, preferably, in relation to 100 pbw olefin polymerization catalyst, the dose of the organosilane is 10-10,000 pbw, more preferably is 20-2,000 pbw, and particularly preferably is 20-200 pbw.

There is no particular restriction on the conditions for mixing the olefin polymerization catalyst and the organosilane homogeneously in the present invention; usually, the conditions may include: mixing temperature in the range of 20–80° C. and mixing time in the range of 0.1-24 h. Furthermore, to enable the organosilane to be dispersed better, white oil and the organosilane may be fixed with the olefin polymerization catalyst homogeneously. Furthermore, in the case that white oil is added, the total concentration of the components of the modified olefin polymerization catalyst in the white oil may be 5-500 g/L.

The method of preparing a modified olefin polymerization catalyst provided in the present invention further comprises a step of preparing an olefin polymerization catalyst, and preferably halloysite is added in the olefin polymerization catalyst preparation process, so that the obtained homopolymerized polyolefin resin has higher melt strength and higher mechanical strength, and the obtained polyolefin elastomer has higher rubber phase content and the rubber phase is at a higher degree of crosslinking. Furthermore, in relation to 100 pbw olefin polymerization catalyst, the dose of the halloysite preferably is 5-80 pbw, more preferably is 5-50 pbw.

The kinds of the olefin polymerization catalyst, organosilane, and halloysite have been described in the above text, and will not be further detailed here.

The modified olefin polymerization catalyst system provided in the present invention contains the above-mentioned modified olefin polymerization catalyst or a modified olefin polymerization catalyst prepared by the above-mentioned method, alkyl aluminum, and an optional external electron donor.

There is no particular restriction on the contents of the components in the modified olefin polymerization catalyst system in the present invention. For example, the weight ratio of the modified olefin polymerization catalyst to the external electron donor to the alkyl aluminum may be 1:0-5:1-1,000, preferably be 1:0-5:1-500, more preferably be 1:0-2.5:1-100.

Examples of the alkyl aluminum include, but are not limited to at least one of trimethyl aluminum, triethyl aluminum, triisobutyl aluminum, aluminum diethyl monochloride, and aluminum diethyl dichloride, etc. Examples of the external electron donor include, but are not limited to at least one of dimethoxy diphenyl silicane, dicyclohexyl dimethoxy silicane, and diisobutyl dimethoxy silicane, etc.

The present invention further provides a use of the modified olefin polymerization catalyst system in olefin polymerization reaction.

Moreover, the present invention further provides a method of preparing polyolefin resin comprising: conducting an olefin polymerization reaction of an olefin monomer in the presence of a catalyst, wherein the catalyst is the above-mentioned modified olefin polymerization catalyst system.

An improvement in the method of preparing polyolefin resin provided in the present invention lies in that the method employs an innovative catalyst. The raw materials of reaction, specific preparation process and conditions may be the same as those in the prior art and are well known to those skilled in the art, and will not be further detailed here. Hereunder the present invention will be detailed in embodiments.

In the following examples and comparative examples, the gel content is measured with the following method:

A homopolymerized polyolefin resin or polyolefin in-reactor alloy is dried in an vacuum drying oven at 50° C. till the weight doesn't change any more, the dry polymer is weighed and the weight is denoted as $W_1$, then the dry polymer is dissolved in dimethyl benzene at 135° C. while the solution is oscillated till the dry polymer is dissolved extensively, the solution is filtered through a 200-mesh stainless steel screen, the undissolved polymer left on the stainless steel screen is collected, and then dried in a vacuum drying oven at 100° C. for 4 h, then the dry polymer is weighed and the weight is denoted as $W_2$; then the gel content is calculated with the following formula:

Gel content (wt. %)=$(W_2/W_1) \times 100$ (wt. %).

Content of rubber phase in the in-reactor polypropylene alloy (wt. %)=[(total weight of the in-reactor polypropylene alloy−weight of the polypropylene obtained in the first stage of polymerization)/total weight of the in-reactor polypropylene alloy]×100 (wt. %).

Example 1

This example is provided to describe the method of preparing the modified olefin polymerization catalyst and the method of preparing the polyolefin resin provided in the present invention.

(1) Preparation of the Modified Olefin Polymerization Catalyst:

5.0 g anhydrous magnesium chloride ($MgCl_2$) and 13.5 mL isooctyl alcohol are dispersed in 50 mL decane, the mixture is heated up to 130° C. to form clear solution, and then the solution is held at 110° C. for 4.0 h for reaction; thus, magnesium chloride-alcohol adduct solution is obtained.

The magnesium chloride-alcohol adduct solution is added by dropwise adding into 100 mL titanium tetrachloride at −20° C. within 1 h, and then the mixture is held at −20° C. for 1.0 h for reaction. Then, the mixture is heated up slowly to 60° C., 2.0 g 9,9-bis(methoxymethyl) fluorene is added into the mixture, then the mixture is held at 110° C. for 2.0 h for reaction; after the reaction is finished, the liquid is filtered of, and then 100 mL titanium tetrachloride is added, and the mixture is held at 120° C. for 2.0 h for reaction. Next, the reaction liquid is filtered off, and the product is washed with hexane for 5 times. Then, 5 mL 7-octenyl trichlorosilane is added, and the mixture is stirred for 2 h. Next, the mixture is dried; thus, a modified olefin polymerization catalyst is obtained. In the modified olefin polymerization catalyst, the content of magnesium chloride is 60 wt. %, the content of Ti is 1.5 wt. %, the content of 9,9-bis(methoxymethyl) fluorene is 5 wt. %, and the content of 7-octenyl trichlorosilane is 25 wt. %, i.e., the modified olefin polymerization catalyst contains an olefin polymerization catalyst and 7-octenyl trichlorosilane, and, in relation to 100 pbw olefin polymerization catalyst, the content of the 7-octenyl trichlorosilane is 33.3 pbw.

(2) Preparation of the Polyolefin Resin:

In a vacuum state, 450 g liquid propylene is loaded into a reactor, and then 0.25 mol triethyl aluminum and 31 mg above-mentioned modified olefin polymerization catalyst are added into the reactor in sequence; the mixture is controlled at 70° C. for 60 min for polymerization reaction; after the polymerization is finished, the gas in the reactor is vented, and the product is discharged; thus, 380 g homopolymerized polypropylene resin is obtained. The homopolymerized polypropylene resin has a branched or crosslinked structure, and the gel content in it is 0.1 wt. %.

Example 2

This example is provided to describe the method of preparing the modified olefin polymerization catalyst and the method of preparing the polyolefin resin provided in the present invention.

(1) Preparation of the Modified Olefin Polymerization Catalyst:

5.0 g anhydrous magnesium chloride ($MgCl_2$) and 13.5 mL isooctyl alcohol are dispersed in 50 mL decane, the mixture is heated up to 130° C. to form clear solution, and then the solution is held at 110° C. for 4.0 h for reaction; thus, magnesium chloride-alcohol adduct solution is obtained.

3.0 g natural halloysite is added into the magnesium chloride-alcohol adduct solution, and then the mixture is held at 110° C. for 4.0 h for reaction; thus, solution that contains halloysite is obtained.

The solution that contains halloysite is added by dropwise adding into 100 mL titanium tetrachloride at −20° C. within 1 h, and then the mixture is held at −20° C. for 1.0 h for reaction. Then, the mixture is heated up slowly to 60° C., 2.0 g 9,9-bis(methoxymethyl) fluorene is added into the mixture, then the mixture is held at 110° C. for 2.0 h for reaction; after the reaction is finished, the liquid is filtered of, and then 100 mL titanium tetrachloride is added, and the mixture is held at 120° C. for 2.0 h for reaction. Next, the reaction liquid is filtered off, and the product is washed with hexane for 5 times. Then, 5 mL 7-octenyl trichlorosilane is added, and the mixture is stirred for 2 h. Next, the mixture is dried; thus, a modified olefin polymerization catalyst is obtained. In the modified olefin polymerization catalyst, the content of magnesium chloride is 35 wt. %, the content of Ti is 1.0 wt. %, the content of 9,9-bis(methoxymethyl) fluorene is 3 wt. %, the content of halloysite is 25 wt. %, and the content of 7-octenyl trichlorosilane is 15 wt. %, i.e., the modified olefin polymerization catalyst contains an olefin polymerization catalyst, 7-octenyl trichlorosilane, and halloysite, and, in relation to 100 pbw olefin polymerization catalyst, the content of the 7-octenyl trichlorosilane is 25 pbw, and the content of the halloysite is 41.7 pbw.

(2) Preparation of the Polyolefin Resin:

In a vacuum state, 450 g liquid propylene is loaded into a reactor, and then 0.25 mol triethyl aluminum and 42 mg above-mentioned modified olefin polymerization catalyst are added into the reactor in sequence; the mixture is controlled at 70° C. for 60 min for polymerization reaction; after the polymerization is finished, the gas in the reactor is vented, and the product is discharged; thus, 275 g homopolymerized polypropylene resin is obtained. The homopolymerized polypropylene resin has a branched or crosslinked structure, and the gel content in it is 0.1 wt. %.

Example 3

This example is provided to describe the method of preparing the modified olefin polymerization catalyst and the method of preparing the polyolefin resin provided in the present invention.

(1) Preparation of the Modified Olefin Polymerization Catalyst:

5.0 g anhydrous magnesium chloride ($MgCl_2$) and 13.5 mL isooctyl alcohol are dispersed in 50 mL decane, the mixture is heated up to 130° C. to form clear solution, and then the solution is held at 110° C. for 4.0 h for reaction; thus, magnesium chloride-alcohol adduct solution is obtained.

The magnesium chloride-alcohol adduct solution is added by dropwise adding into 100 mL titanium tetrachloride at −20° C. within 1 h, and then the mixture is held at −20° C. for 1.0 h for reaction. Then, the mixture is heated up slowly to 60° C., 2.0 g 9,9-bis(methoxymethyl) fluorene is added into the mixture, then the mixture is held at 110° C. for 2.0 h for reaction; after the reaction is finished, the liquid is filtered of, and then 100 mL titanium tetrachloride is added, and the mixture is held at 120° C. for 2.0 h for reaction. Next, the reaction liquid is filtered off, and the product is washed with hexane for 5 times. Next, the product is dried, and thereby a solid product is obtained.

5 g above-mentioned solid is added into 20 g dried white oil (Vaseline oil), then 5 mL 7-octenyl trichlorosilane is added, and the mixture is stirred at 70° C. for 2 h; thus, a modified polyolefin polymerization catalyst liquid is obtained. In the modified polyolefin polymerization catalyst liquid, the content of the white oil is 66.7 wt. %, the content of magnesium chloride is 13.3 wt. %, the content of Ti is 0.25 wt. %, the content of 9,9-bis(methoxymethyl) fluorene is 1 wt. %, and the content of 7-octenyl trichlorosilane is 13 wt. %, i.e., the modified olefin polymerization catalyst contains an olefin polymerization catalyst and 7-octenyl trichlorosilane, and, in relation to 100 pbw olefin polymerization catalyst, the content of the 7-octenyl trichlorosilane is 14.9 pbw.

(2) Preparation of the Polyolefin Resin:

In a vacuum state, 450 g liquid propylene is loaded into a reactor, and then 0.25 mol triethyl aluminum and 90 mg above-mentioned modified olefin polymerization catalyst liquid are added into the reactor in sequence; the mixture is controlled at 70° C. for 60 min for polymerization reaction; after the polymerization is finished, the gas in the reactor is vented, and the product is discharged; thus, 405 g homopolymerized polypropylene resin is obtained. The homopolymerized polypropylene resin has a branched or crosslinked structure, and the gel content in it is 0.5 wt. %.

Example 4

This example is provided to describe the method of preparing the modified olefin polymerization catalyst and the method of preparing the polyolefin resin provided in the present invention.

(1) Preparation of the Modified Olefin Polymerization Catalyst 24 g anhydrous magnesium chloride, 390 mL white Vaseline oil, 50 mL ethanol, 10 mL silicon oil, and 2 mL span are loaded into a high pressure reactor, the mixture is stirred and heated up to 130° C., and held at the temperature for 3 h, so that the solid is fully dissolved; next, 10 g halloysite is added, and then nitrogen is charged to increase the pressure in the reactor to 1.0 MPa; then, the discharge value is opened, and the mixture in the reactor is sprayed through a thin tube in 1.2 mm diameter and 3.5 m length into 2.5 L kerosene at −40° C.; all of the collected mixture is filtered, and the solid product is washed with hexane for 5 times; then the solid product is dried at room temperature; thus, spherical particles of a magnesium chloride-alcohol adduct in 30-50 μm particle size are obtained.

The spherical particles of magnesium chloride-alcohol adduct are added slowly into 100 mL titanium tetrachloride at −20° C., and then the mixture is held at −20° C. for 1.0 h for reaction; next, the mixture is heated up slowly to 60° C., 2.0 g 9,9-bis(methoxymethyl) fluorene is added into the mixture, and then the mixture is held at 110° C. for 2.0 h for reaction; after the reaction is finished, the liquid is filtered off, and then 100 mL titanium tetrachloride is added again, and the mixture is held at 120° C. for 2.0 h for reaction. Next, the reaction liquid is filtered off, and the product is washed with hexane for 5 times; then, the product is dried to obtain a solid product.

5 g above-mentioned solid is added into 10 g dried white oil (Vaseline oil), then 10 mL 7-octenyl trichlorosilane is added, and the mixture is stirred at 70° C. for 2 h; thus, a modified polyolefin polymerization catalyst liquid is obtained. In the modified polyolefin polymerization catalyst liquid, the content of the white oil is 40 wt. %, the content of magnesium chloride is 10 wt. %, the content of Ti is 0.45 wt. %, the content of 9,9-bis(methoxymethyl) fluorene is 0.8 wt. %, the content of the halloysite is 6 wt. %, and the content of 7-octenyl trichlorosilane is 40 wt. %, i.e., the modified olefin polymerization catalyst contains an olefin polymerization catalyst, 7-octenyl trichlorosilane, and halloysite, and, in relation to 100 pbw olefin polymerization catalyst, the content of the 7-octenyl trichlorosilane is 200 pbw, and the content of the halloysite is 25 pbw.

(2) Preparation of the Polyolefin Resin

In a vacuum state, 450 g liquid propylene is loaded into a reactor, and then 0.25 mol triethyl aluminum and 80 mg above-mentioned modified olefin polymerization catalyst liquid are added into the reactor in sequence; the mixture is controlled at 70° C. for 60 min for polymerization reaction; after the polymerization is finished, the gas in the reactor is vented, and the product is discharged; thus, 450 g homopolymerized polypropylene resin is obtained. The homopolymerized polypropylene resin has a branched or crosslinked structure, and the gel content in it is 2.0 wt. %.

Example 5

This example is provided to describe the method of preparing the modified olefin polymerization catalyst and the method of preparing the polyolefin resin provided in the present invention.

(1) Preparation of the Modified Olefin Polymerization Catalyst:

1.0 g transitional metal compound rac-Me$_2$Si(2-Me-4-PhInd)$_2$ZrCl$_2$ (wherein rac—represents "racemized", Me is methyl, Ph is phenyl, and Ind is indentyl) is added into 40 mL toluene solution that contains 0.2 mol methylaluminoxane at 0° C., the mixture is held at 0° C. for 4.0 h for reaction, and then 0.5 g halloysite is added into the mixture, and the mixture is held at 60° C. for 2 h for reaction; next, 2 mL 2-(5-ethylidene-2-norbornene) ethyl trichlorosilane is added; thus, a modified olefin polymerization catalyst is obtained. The modified olefin polymerization catalyst contains an olefin polymerization catalyst, 2-(5-ethylidene-2-norbornene) ethyl trichlorosilane, and halloysite, and, in relation to 100 pbw olefin polymerization catalyst, the content of the 2-(5-ethylidene-2-norbornene) ethyl trichlorosilane is 200 pbw, and the content of the halloysite is 50 pbw.

(2) Preparation of the Polyolefin Resin:

In a vacuum state, 450 g liquid propylene is loaded into a reactor, and then 0.25 mol aluminum methylate and 40 mg above-mentioned modified olefin polymerization catalyst are added into the reactor in sequence; the mixture is controlled at 70° C. for 60 min for polymerization reaction; after the polymerization is finished, the gas in the reactor is vented, and the product is discharged; thus, 240 g homopolymerized polypropylene resin is obtained. The homopolymerized polypropylene resin has a branched or crosslinked structure, and the gel content in it is 52 wt. %.

Example 6

This example is provided to describe the method of preparing the modified olefin polymerization catalyst and the method of preparing the polyolefin resin provided in the present invention.

(1) Preparation of the Modified Olefin Polymerization Catalyst 1.5 g transitional metal compound Me$_2$C(Cp)(Flu)ZrCl$_2$ (wherein Me is methyl, Cp is cyclopentadienyl, and Flu is fluorenyl) is added into 40 mL toluene solution that contains 0.25 mol methylaluminoxane at 0° C., the mixture is held at 0° C. for 4.0 h for reaction, and then 5.0 g halloysite is added into the mixture, and the mixture is held at 60° C. for 2 h for reaction; next, 2 mL 2-(3-cyclohexenyl) ethyl trichlorosilane is added; thus, a modified olefin polymerization catalyst is obtained. The modified olefin polymerization catalyst contains an olefin polymerization catalyst, 2-(3-cyclohexenyl) ethyl trichlorosilane, and halloysite, and, in relation to 100 pbw olefin polymerization catalyst, the content of the 2-(3-cyclohexenyl) ethyl trichlorosilane is 26.6 pbw, and the content of the halloysite is 18.9 pbw.

(2) Preparation of the Polyolefin Resin:

In a vacuum state, 450 g liquid propylene is loaded into a reactor, and then 0.25 mol aluminum methylate and 30 mg above-mentioned modified olefin polymerization catalyst are added into the reactor in sequence; the mixture is controlled at 70° C. for 60 min for polymerization reaction; after the polymerization is finished, the gas in the reactor is vented, and the product is discharged; thus, 230 g homopolymerized polypropylene resin is obtained. The homopolymerized polypropylene resin has a branched or crosslinked structure, and the gel content in it is 67 wt. %.

Example 7

This example is provided to describe the method of preparing the modified olefin polymerization catalyst and the method of preparing the polyolefin resin provided in the present invention.

The modified olefin polymerization catalyst and the polyolefin resin are prepared by the method described in Example 2, but the 7-octenyl trichlorosilane is replaced with 2-(dicyclopentadiene) ethylidene trichlorosilane in the same volume; thus, a homopolymerized polypropylene resin is obtained. The homopolymerized polypropylene resin has a branched or crosslinked structure, and the gel content in it is 3.9 wt. %.

Example 8

This example is provided to describe the method of preparing the modified olefin polymerization catalyst and the method of preparing the polyolefin resin provided in the present invention.

The modified olefin polymerization catalyst and the polyolefin resin are prepared by the method described in Example 2, but the 7-octenyl trichlorosilane is replaced with 7-octenyl dimethoxy chlorosilane in the same volume; thus, a homopolymerized polypropylene resin is obtained. The gel content in the homopolymerized polypropylene resin is 0 wt. %.

Example 9

This example is provided to describe the method of preparing the modified olefin polymerization catalyst and the method of preparing the polyolefin resin provided in the present invention.

The modified olefin polymerization catalyst and the polyolefin resin are prepared by the method described in Example 2, but no halloysite is added in the preparation process of the modified olefin polymerization catalyst; thus, a homopolymerized polypropylene resin is obtained. The homopolymerized polypropylene resin has a branched or crosslinked structure, and the gel content in it is 0.05 wt. %.

Example 10

This example is provided to describe the method of preparing the modified olefin polymerization catalyst and the method of preparing the polyolefin resin provided in the present invention.
(1) Preparation of the Modified Olefin Polymerization Catalyst The modified olefin polymerization catalyst is prepared by the method described in Embodiment 2. In the modified olefin polymerization catalyst, the content of magnesium chloride is 35 wt. %, the content of Ti is 1.0 wt. %, the content of 9,9-bis(methoxymethyl) fluorene is 3 wt. %, the content of halloysite is 25 wt. %, and the content of 7-octenyl trichlorosilane is 15 wt. %, i.e., the modified olefin polymerization catalyst contains an olefin polymerization catalyst, 7-octenyl trichlorosilane, and halloysite, and, in relation to 100 pbw olefin polymerization catalyst, the content of the 7-octenyl trichlorosilane is 25 pbw, and the content of the halloysite is 41.7 pbw.
(2) Preparation of the Polyolefin Resin:

In a vacuum state, 500 g liquid propylene monomer is loaded into a reactor, then 0.25 mol triethyl aluminum, 20 mg above-mentioned modified olefin polymerization catalyst, and 0.2 g hydrogen are added into the reactor in sequence, and the mixture is heated up to 70° C. and held at the temperature for 0.2 h for reaction. Next, the residual propylene monomer in the reactor is discharged, and the temperature in the reactor is decreased to 50° C.; then a gas mixture of 20 g ethylene and 60 g propylene is charged into the reactor, and the reaction temperature is controlled at 90° C. for 0.2 h for reaction; after the reaction is finished, acidified ethanol is added to terminate the polymerization reaction, and then the product is washed with 50° C. deionized water and 50° C. ethanol for 3 times respectively; finally the product is vacuum-dried at 60° C.; thus, an in-reactor polypropylene alloy is obtained. Measured in a detection process, the content of the rubber phase in the in-reactor polypropylene alloy is 60 wt. %, and the rubber phase has a crosslinked structure, and the content of the gel phase is 55 wt. %.

Example 11

This example is provided to describe the method of preparing the modified olefin polymerization catalyst and the method of preparing the polyolefin resin provided in the present invention.

The modified olefin polymerization catalyst and the polyolefin resin are prepared by the method described in Example 10, but the 7-octenyl trichlorosilane is replaced with di-(7-octenyl) dichlorosilane in the same volume; thus, an in-reactor polypropylene alloy is obtained. Measured in a detection process, the content of the rubber phase in the in-reactor polypropylene alloy is 70 wt. %, and the rubber phase has a crosslinked structure, and the content of the gel phase is 65 wt. %.

Example 12

This example is provided to describe the method of preparing the modified olefin polymerization catalyst and the method of preparing the polyolefin resin provided in the present invention.

The modified olefin polymerization catalyst and the polyolefin resin are prepared by the method described in Embodiment 10, but no halloysite is added in the preparation process of the modified olefin polymerization catalyst; thus, an in-reactor polypropylene alloy is obtained. Measured in a detection process, the content of the rubber phase in the in-reactor polypropylene alloy is 55 wt. %, and the rubber phase has a crosslinked structure, and the content of the gel phase is 50 wt. %.

Comparative Example 1

This comparative example is provided to describe a method of preparing a reference modified olefin polymerization catalyst and a method of preparing a reference polyolefin resin.

The modified olefin polymerization catalyst and the polyolefin resin are prepared by the method described in Example 2, but no 7-octenyl trichlorosilane is added in the preparation process of the modified olefin polymerization catalyst; thus, a reference homopolymerized polypropylene resin is obtained.

Comparative Example 2

This comparative example is provided to describe a method of preparing a reference modified olefin polymerization catalyst and a method of preparing a reference polyolefin resin.

The modified olefin polymerization catalyst and the polyolefin resin are prepared by the method described in Example 2, but the 7-octenyl trichlorosilane is replaced with tetrachlorosilane in the same volume; thus, a reference homopolymerized polypropylene resin is obtained.

Comparative Example 3

This comparative example is provided to describe a method of preparing a reference modified olefin polymerization catalyst and a method of preparing a reference polyolefin resin.

The modified olefin polymerization catalyst and the polyolefin resin are prepared by the method described in Example 2, but the 7-octenyl trichlorosilane is replaced with tetramethoxysilane in the same volume; thus, a reference homopolymerized polypropylene resin is obtained.

Test Cases

The test cases are provided to describe tests of the properties of the polyolefin resin.

(1) Test of Melt Strength

The experimental apparatus for determining melt strength consists of a single screw extrusion machine equipped with capillary tubes and a Gottfert Rheotens melt strength tester. First, melt mass of polyolefin resin of which the melt strength is to be tested is extruded through an outlet die of the extrusion machine, and then the obtained extruded melt beam sample is drawn by two rollers moving in opposite directions on an equalizing beam. The tensile force suffered by the melt beam when the melt beam is drawn is a function of roller speed and time. The rollers are accelerated and rotated at uniform acceleration, till the melt beam is broken. The tensile force suffered by the melt beam at the time the melt beam is broken is defined as melt strength. The obtained result is shown in Table 1.

(2) Test of Mechanical Properties

The impact strength is measured with the method specified in ASTM D256A, and the result is shown in Table 1.

The tensile strength is measured with the method specified in ISO527-2-5A, and the result is shown in Table 1.

The flexural modulus is measured with the method specified in ASTM 638-V, and the result is shown in Table 1.

TABLE 1

| No. | Melt strength, cN | Impact strength, kJ/m$^2$ | Tensile strength, MPa | Flexural modulus, MPa |
| --- | --- | --- | --- | --- |
| Example 1 | 65 | 9.8 | 45.6 | 1480 |
| Example 2 | 45 | 8.5 | 41.9 | 1410 |
| Example 3 | 38 | 8.1 | 40.9 | 1390 |
| Example 4 | 108 | 18.2 | 51.2 | 1510 |
| Example 5 | 221 | 24.2 | 61.1 | 1630 |
| Example 6 | 198 | 17.8 | 55.2 | 1490 |
| Example 7 | 79 | 10.0 | 44.6 | 1481 |
| Example 8 | 37 | 7.8 | 41.0 | 1300 |
| Example 9 | 42 | 8.1 | 41.2 | 1350 |
| Comparative Example 1 | 9 | 4.8 | 32.0 | 1190 |
| Comparative Example 2 | 8.5 | 4.9 | 31.8 | 1100 |
| Comparative Example 3 | 10 | 5.2 | 32.9 | 1200 |

It is seen from the above result: the homopolymerized polyolefin resin prepared by the modified olefin polymerization catalyst provided in the present invention has higher melt strength and higher mechanical strength, the obtained polyolefin elastomer has higher rubber phase content, and the rubber phase is crosslinked into a crosslinked structure to a higher degree. It is seen from the comparison between Example 2 and the examples 8-9: if the $R^1$ in the organosilane is a $C_2$-$C_{18}$ alkyl group and the terminal of $R^1$ has an α-olefin double bond, a norbornene group, a cycloolefin group or a dicyclopentadiene group, X is a halogen element, $R^2$ is a $C_1$-$C_5$ linear chain, branched chain or isomerized alkyl group, m is 1, n is 3, and k is 0, or if the modified olefin polymerization catalyst further contains halloysite, the obtained homopolymerized polyolefin resin has higher melt strength and higher mechanical strength. It is seen from the comparison between Example 10 and the examples 11-12: if the $R^1$ in the organosilane is a $C_2$-$C_{20}$ alkyl group and the terminal of $R^1$ contains an α-olefin double bond, a norbornene group, a cycloolefin group or a dicyclopentadiene group, X is a halogen element, $R^2$ is a $C_1$-$C_{10}$ linear chain, branched chain or isomerized alkyl group, m is 2 or 3, n is 1 or 2, k is 0, and m+n+4=4, or if the modified olefin polymerization catalyst further contains halloysite, the obtained polyolefin elastomer has higher rubber phase content, and the rubber phase is at a higher degree of crosslinking. It is seen from the comparison between Example 2 and Comparative Examples 2-3: the organosilane provided in the present invention behaves differently from silicon tetrahlaide and tetraalkoxysilane in the olefin polymerization reaction process, and the homopolymerized polyolefin resin obtained with a modified olefin polymerization catalyst that contains the organosilane provided in the present invention has higher melt strength and higher mechanical strength.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A modified olefin polymerization catalyst comprising an olefin polymerization catalyst and at least one organosilane, wherein the at least one organosilane is selected either from the group consisting of 5-hexenyl trichlorosilane, 2-(5-ethylidene-2-norbornene) ethyl trichlorosilane, 2-(3-cyclohexenyl) ethyl trichlorosilane, 4-(2,7-cyclooctadiene) butyl trichlorosilane, and 2-(dicyclopentadiene) ethylidene trichlorosilane, or the group consisting of 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, di-(7-octenyl) dichlorosilane, 2-(5-ethylidene-2-norbornene) ethyl allyl dichlorosilane, di-[2-(5-ethylidene-2-norbornene) ethyl] dichlorosilane, di-[2-(3-cyclohexenyl) ethyl] dichlorosilane, 2-(dicyclopentadiene) ethylidene allyl dichlorosilane, and di-[2-(dicyclopentadiene) ethylidene] dichlorosilane;

wherein the modified olefin polymerization catalyst further contains halloysite, and in relation to 100 pbw olefin polymerization catalyst, the content of the halloysite is 5-80 pbw.

2. The modified olefin polymerization catalyst according to claim 1, wherein in relation to 100 pbw olefin polymerization catalyst, the content of the organosilane is 10-10,000 pbw.

3. The modified olefin polymerization catalyst according to claim 1, wherein the olefin polymerization catalyst is at least one of Ziegler-Natta catalyst and metallocene catalyst.

4. A modified olefin polymerization catalyst system containing the modified olefin polymerization catalyst according to claim 1, alkyl aluminum, and an optional external electron donor.

5. The modified olefin polymerization catalyst system according to claim 4, wherein the weight ratio of the modified olefin polymerization catalyst to the external electron donor to the alkyl aluminum is 1:0-5:1-1,000.

6. A method of preparing polyolefin resin comprising: conducting an olefin polymerization reaction of an olefin monomer in the presence of a catalyst, wherein the catalyst is the modified olefin polymerization catalyst system according to claim 4.

* * * * *